(12) United States Patent
Berbert (10) Patent No.: US 9,827,738 B2
(45) Date of Patent: Nov. 28, 2017

(54) CHUB PACKAGING WEBS WITH ENHANCED PUNCTURE RESISTANCE

(71) Applicant: BEMIS COMPANY, INC., Neenah, WI (US)

(72) Inventor: Otacilio T. Berbert, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 15/029,108

(22) PCT Filed: Nov. 13, 2013

(86) PCT No.: PCT/US2013/069775
§ 371 (c)(1),
(2) Date: Apr. 13, 2016

(87) PCT Pub. No.: WO2015/072978
PCT Pub. Date: May 21, 2015

(65) Prior Publication Data
US 2016/0236442 A1   Aug. 18, 2016

(51) Int. Cl.
*B32B 7/04* (2006.01)
*B32B 27/08* (2006.01)
(Continued)

(52) U.S. Cl.
CPC .............. *B32B 7/045* (2013.01); *A23L 1/317* (2013.01); *B32B 1/00* (2013.01); *B32B 1/02* (2013.01); *B32B 1/08* (2013.01); *B32B 3/00* (2013.01); *B32B 3/12* (2013.01); *B32B 7/00* (2013.01); *B32B 7/12* (2013.01); *B32B 7/14* (2013.01);
(Continued)

(58) Field of Classification Search
CPC  B32B 7/045; B32B 27/08; B32B 7/00; B32B 7/12; B32B 7/14; B32B 27/00; B32B 27/06; B32B 27/30; B32B 27/306; B32B 27/34; B32B 1/00; B32B 1/02; B32B 1/08; B32B 3/00; B32B 3/12; B32B 2439/00; B32B 2439/70; B32B 27/32; A23L 1/317;
(Continued)

(56) References Cited

U.S. PATENT DOCUMENTS 3,956,867 A   5/1976   Utz et al.
4,909,726 A   3/1990   Bekele
(Continued)

FOREIGN PATENT DOCUMENTS

EP   787656 B1   8/1997
EP   1177891 A1   2/2002
(Continued)

*Primary Examiner* — Michael C Miggins
(74) *Attorney, Agent, or Firm* — Amy L. De Coster (57) ABSTRACT

The present disclosure is concerned with chub packaging webs with improved puncture resistance suitable for use in chub packaging. The webs have a double waii partially laminated structure. The structure is conveniently formed by adhesively laminating two component films in a face to face configuration using a pattern of adhesive which leaves a substantial portion of the two facing surfaces unlaminated. Preferably, each of the component films comprise at least one layer of nylon and has a moisture content of greater than 1% by weight such that the double wall partially laminated web has a total energy impact absorption value of greater 0.59 foot-pound at −20° C. measured in accordance with ASTM D-7192 test method.

20 Claims, 7 Drawing Sheets

(51) Int. Cl.

| | | |
|---|---|---|
| B32B 7/00 | (2006.01) | |
| B32B 7/12 | (2006.01) | |
| B32B 7/14 | (2006.01) | |
| B32B 27/00 | (2006.01) | |
| B32B 27/06 | (2006.01) | |
| B32B 27/30 | (2006.01) | |
| B32B 27/34 | (2006.01) | |
| B32B 1/00 | (2006.01) | |
| B32B 1/02 | (2006.01) | |
| B32B 1/08 | (2006.01) | |
| B32B 3/00 | (2006.01) | |
| B32B 3/12 | (2006.01) | |
| A23L 1/317 | (2006.01) | |
| B32B 27/32 | (2006.01) | |
| B65D 65/40 | (2006.01) | |
| B65D 75/30 | (2006.01) | |
| B65D 85/08 | (2006.01) | |

(52) U.S. Cl.
CPC .............. *B32B 27/00* (2013.01); *B32B 27/06* (2013.01); *B32B 27/08* (2013.01); *B32B 27/30* (2013.01); *B32B 27/306* (2013.01); *B32B 27/32* (2013.01); *B32B 27/34* (2013.01); *B65D 65/40* (2013.01); *B65D 75/30* (2013.01); *B65D 85/08* (2013.01); *A23V 2002/00* (2013.01); *B32B 2307/558* (2013.01); *B32B 2439/00* (2013.01); *B32B 2439/70* (2013.01)

(58) Field of Classification Search
CPC ........ B65D 65/40; B65D 75/30; B65D 85/08; A23V 2002/00
See application file for complete search history.

(56) References Cited

U.S. PATENT DOCUMENTS

| | | |
|---|---|---|
| 5,495,705 A | 3/1996 | Miura et al. |
| 6,085,903 A | 7/2000 | Jotcham et al. |
| 6,858,106 B1 | 2/2005 | Ikenoya |
| 7,434,692 B2 | 10/2008 | Ginsberg et al. |
| 7,726,484 B2 | 6/2010 | Komatsu et al. |
| 7,726,486 B2 | 6/2010 | Jones |
| 2004/0071903 A1 | 4/2004 | Ramesh et al. |
| 2005/0163948 A1 | 7/2005 | McGarel |
| 2007/0254120 A1 | 11/2007 | Rasmussen |
| 2010/0183830 A1 | 7/2010 | Berbert |
| 2010/0199610 A1 | 8/2010 | Komatsu et al. |
| 2011/0117307 A1 | 5/2011 | Fraser et al. |
| 2012/0134606 A1 | 5/2012 | Borchardt et al. |
| 2013/0095335 A1 | 4/2013 | Hermel-Davidock |
| 2013/0188889 A1 | 7/2013 | Fraser et al. |
| 2013/0188891 A1 | 7/2013 | Maxwell et al. |

FOREIGN PATENT DOCUMENTS

| | | |
|---|---|---|
| EP | 1285744 A1 | 2/2003 |
| EP | 2070837 A1 | 6/2009 |
| WO | 2009077841 A1 | 6/2009 |

CHUB PACKAGING WEBS WITH ENHANCED PUNCTURE RESISTANCE

FIELD OF THE INVENTION

The present invention relates generally to food packages, and more particularly to chub packaging materials formed from pattern laminated double wall packaging webs.

BACKGROUND OF THE INVENTION

Certain foods, and particularly meat products such as ground beef and other comminuted food substances, are commonly packaged in what are called chub packages. These packages are generally produced at central processing plants operated by supermarket chains or meat packing companies. It is known in the art that chub packages are generally produced using a vertical form fill seal (VFFS) process and equipment, in which a tube is formed from a flat web of roll stock. The tube is formed vertically and longitudinally sealed which may include the use of a vertical sealing bar. The longitudinal seal or seam is formed by heat-sealing the overlapping edges of the packaging film as it passes through a sealing device of the VFFS equipment. The longitudinal seal is aligned in the machine direction of the roll stock. The heat-sealing process may be accomplished using supersonic sealing, high frequency sealing and a hot-air knife sealing system. Sealing thermoplastic materials by means of a hot-air knife sealing system typically includes supplying a compressed jet of hot air at temperatures of between 120° C. and 700° C. and at pressures of between 0.4 and 0.8 bar directed towards the zone where the seal is to be formed between the edges of thermoplastic material. The vertical sealing bar then engages the packaging film for a predetermined dwell time to weld the overlapping edges of the packaging film and form a heat seal. A packaging film must have sufficient heat resistance to withstand relatively high temperatures and pressures during sealing process, yet can fuse together to produce a reliable, hermetic heat seal.

With the longitudinally seal formed, the bottom of the tube may then be sealed with a metal clip applied to the bottom of the tube (known as crimping) and a comminuted product pumped into the open end of the tube. The top of the filled tube is then sealed with another metal clip to produce the final chub package. In appearance, these chub packages resemble semi-rigid tubes with the tubular web forming a skin tight layer around the food product. Package sizes may range from 1 to 20 pounds, depending on the intended mode of distribution. The equipment typically used to stuff a food and non-food products into the tubular web can produce stress on the entire package, particularly at the crimped ends and along the longitudinal seal of the tube. During the crimping operation, a sharp-edged leg of the metal clip may pierce or tear the packaging web. As a result, the contents of the package leaks through the hole in the packaging web due to the residual pressure in the package produced during the stuffing process. The sharp-edged leg of the metal clip may also puncture neighboring packages during packaging process, especially when the chub packages have been frozen and weigh five or more pounds. Consequentially, the package product must then be discarded by the manufacturer.

Accordingly, there is needed chub packaging materials with improved puncture resistance which provides greater toughness and/or penetration resistance to withstand the heat-sealing and crimping operations of the vertical form fill seal process.

SUMMARY OF THE INVENTION

It is an object of the present invention to provide a chub packaging web having increased puncture resistance by forming a packaging web from two independently manufactured thermoplastic films which have been partially laminated to each other in a manner such that a substantial portion of the two surfaces facing each other are unlaminated but also such that the partially laminated films can undergo the heat-sealing and crimping operations of the vertical form fill seal process as a single packaging web unit. Advantageously, each of the two independently manufactured films comprises at least one layer of nylon and has a moisture content of greater than 1% by weight or between 1% by weight and 3% by weight. Preferably, the double wall partially laminated web has a total energy impact absorption value of greater than 0.59 foot-pound at −20° C. as measured in accordance with ASTM D-7192 test method. It is particularly advantageous when the double wall partially laminated web has a total energy impact absorption value of about 1.0 foot-pound at −20° C. or more as measured in accordance with ASTM D-7192 test method.

In a preferred embodiment the invention involves two independently manufactured films partially laminated together where each film comprises at least two layers of nylon and has a moisture content of greater than 0.5% by weight. In another preferred embodiment, the invention encompasses two independently manufactured films partially laminated together where each of the two independently manufactured films comprises at least two layers of nylon and such that each film has a moisture content of between 0.5% and 0.75% by weight.

In another preferred embodiment the invention involves two independently manufactured films partially laminated together where each film comprises at least one layer of nylon having moisture content of greater than 1% by weight and at least two layers comprising ultra-low density polyethylene (ULDPE). In another preferred embodiment the invention involves two independently manufactured films partially laminated together where each film comprises at least two layers of nylon and has a moisture content of greater than 0.5% by weight, and at least two layers comprising ultra-low density polyethylene.

In still another preferred embodiment the invention involves two independently manufactured films partially laminated together where each film comprises at least one layer of nylon and has a moisture content of greater than 1% by weight and at least four layers comprising ultra-low density polyethylene. In another preferred embodiment the invention involves two independently manufactured films partially laminated together where each film comprises at least two layers of nylon and has a moisture content of greater than 0.5% by weight, and at least four layers comprising ultra-low density polyethylene.

In still another preferred embodiment the invention involves independently manufactured films which have been partially adhesively laminated as described herein where less than about 50% of the facing surfaces of two independently manufactured films are laminated, more preferably less than about 25%.

It is preferred that the two edges of the two partially laminated films which run in the machine direction are continuously laminated to provide a double wall web with sealed side edges. It is especially preferred that the lamination sites between the two films form a regular repeating pattern. It is particularly preferred that the pattern be at least two strips, a honeycomb with hexagon or spaced apart circles as the un-laminated areas or spaced apart dots or circles of lamination. It is particularly convenient if the lamination is achieved with the use of an adhesive. A particularly preferred class of adhesives is the two part polyurethane adhesives, particularly those available with solids content greater than about 30 wt %.

In a preferred embodiment each of the two independently manufactured films comprises at least two layers of ultra-low density polyethylene. An especially convenient construction is one using two identical independently manufactured films as the components. It is also particularly helpful if the surfaces of the two component films which face each other are heat sealable to each other. It is particularly convenient if both independently manufactured films contain an oxygen barrier such as ethylene vinyl alcohol copolymer, thus providing protection for the packaged food item even if one of the component films is punctured.

BRIEF DESCRIPTION OF THE DRAWINGS

FIG. 6 is a cylindrically shaped chub package formed from partially laminated film 10 to film 14.

DETAILED DESCRIPTION OF THE INVENTION

The present invention involves webs which have improved puncture resistance obtained in an economical manner by a particular structure involving the partial adhesive lamination of two independently formed thermoplastic films. This structure is capable of being used in the well-known packaging procedures for chub packages. This structure involves a pattern of adhesive lamination which leaves substantial areas of the internal surfaces both films which face each other unlaminated. It is believed that there is a balance between complete lamination between the entire areas of the two facing surfaces, which offers less puncture resistance and such minimal lamination that the two film components are not able to properly form into chub packages in this well know packaging procedures. This partial lamination approach provides puncture resistance formerly only available from much more expensive thermoplastic film.

The component films used to form the partially laminated double wall webs can be any of the thermoplastic films known for use in the flexible packaging industry comprising at least one layer of nylon such that the film has a moisture content of greater than 1% by weight. These films should be heat-sealable or adhesively laminatable to each other. In addition, at least one of them should have a surface opposite its lamination surface (i.e. the surface which faces the other component film) which is heat sealable under typical industry conditions. If the items to be packaged are subjected to accelerated degradation on exposure to atmospheric oxygen, such as various food items including animal derived products, it is desirable to include an oxygen barrier in the film structure of one of the component films. It is particularly desirable to include an oxygen barrier in the structure of both component films so that a partial puncture through just one of the oxygen barriers will not compromise the oxygen barrier integrity of the resultant packaging. It is convenient to just partially adhesively laminate two identical films.

The adhesive used to join the component films can be any of those commonly used in the flexible packaging industry. It is convenient if the adhesive has sufficient viscosity to retain the pattern in which it is applied. The particular properties of the adhesive will to some extent depend on the manner in which it is applied such as whether it is applied as a solid or out of a solution. Particularly convenient are the two part polyurethane adhesives, particularly those available with solids content greater than about 30 wt %.

Component film structures with at least one layer of nylon and having a moisture content of greater than 1% by weight based on the total weight of the nylon layer are particularly useful for making the partially laminated double wall webs. One approach to this nylon layer is the use polyamides having a value of water absorption of at least 1% by weight at 23° C. and 50% relative humidity. One example of a commercially available polyamide having this characteristic is ULTRAMID® B40 L nylon 6 supplied by BASF Chemical Company. ULTRAMID® B40 has a water absorption of 2.6% by weight at 23° C. and 50% relative humidity and a saturation in water, water absorption of 9.5% by weight at 23° C.

One procedure for ensuring that one or both component films has a moisture content of greater than 1% by weight is by exposing an entire roll of coextruded multilayer film to a water bath for a sufficient amount of time such that approximately 2.9% by weight of water is absorbed by the roll. The moisture uptake in the sample roll can be periodically calculated by recording the weight gain using a balance. The water absorption may also be determined on a small film sample using Karl-Fischer unit.

Component film structures with at least two or four layers of ultra-low density polyethylene (ULDPE) are particularly useful for making the partially laminated double wall webs. One approach to these ULDPE layers is the use of a ultra-low density polyethylene having a specific gravity of 0.907, a melt mass-flow rate (190° C./2.16 kg) of 0.80 g/10 min, and a melting point (DSC) of 123° C. One example of a commercially available ULDPE having these characteristics is ATTANE™4203 supplied by Dow Chemical Company.

Films with an EVOH core sandwiched between two polyamide layers are the basis for a number of films suitable for the partially laminated double wall webs. The polyamide layers have been found useful in stabilizing the EVOH layer during thermal processing, have good adhesion to the EVOH and impart good mechanical strength to the film structure. A convenient way to marry this core to heat sealable exterior layers is through the use of polyethylene exterior layers joined to the polyamide (or nylon) layers via tie layers well known in the industry for promoting extrusion adhesion between polyethylene layers and polyamide layers. Among these are polyethylene copolymers which have been modified to carry anhydride functionality. Seven layer films based upon this approach have found favor in the flexible packaging industry and are particularly well suited as component films for the partially laminated double wall webs. These component films are conveniently made by the well know melt extrusion technique in which multiple extruders feed a single extrusion die, with each extruder being responsible for the production of a particular layer.

The advantages of the present invention can best be realized by using thermoplastic films commonly employed with the semi-automatic chub packaging machines to form the double walled partially laminated structure. Among these the blown films, particularly those of thinner gauges are particularly preferred. The desired puncture resistance might also be obtainable by increases in web gauge (or thickness) but this poses problems of not only cost but also formability. As the gauge or thickness increases, the cost of manufacturing the web increases. The present invention therefore provides the ability to obtain the desired puncture resistance with an inexpensive web.

Figure 1A:
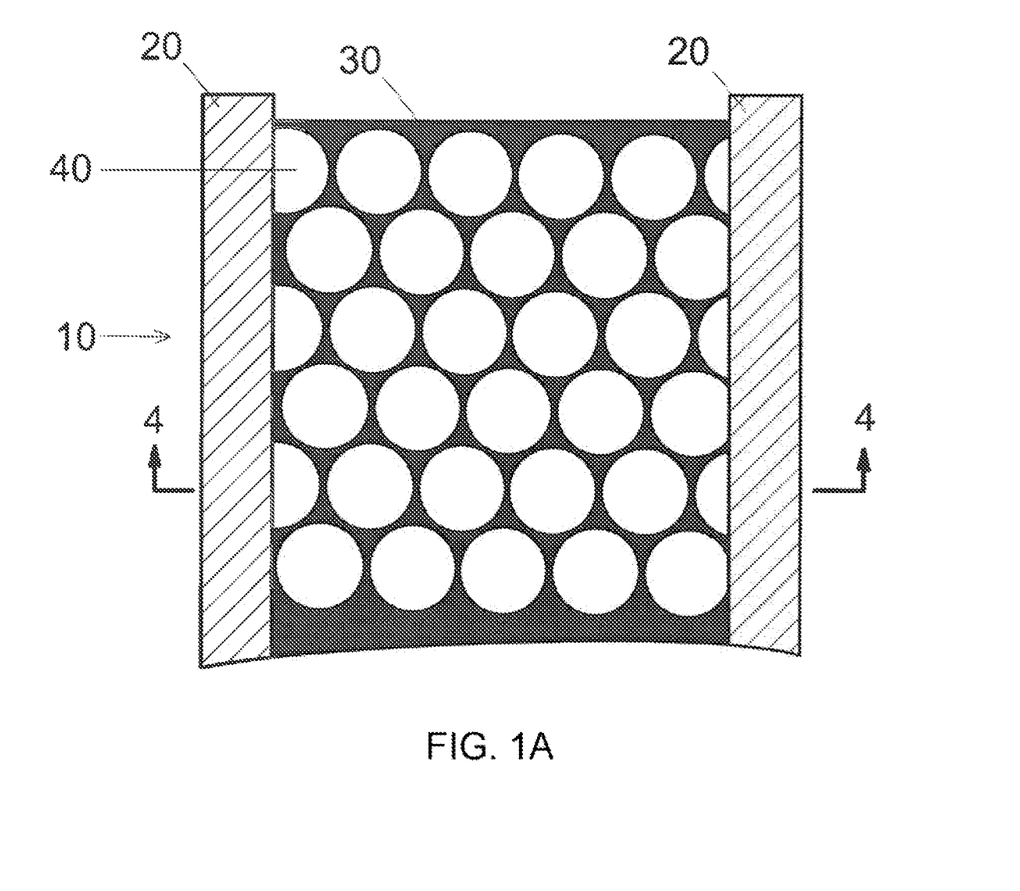
FIG. 1 is a top plan view of the partially laminated film 10 showing the two strips of adhesive 20 adhering the edges of the top film 12 to the edges of the bottom film 14 which are illustrated in FIG. 4. Also shown is a honeycomb pattern of adhesive 30 with the resultant circular voids 40.
Figure 1B:
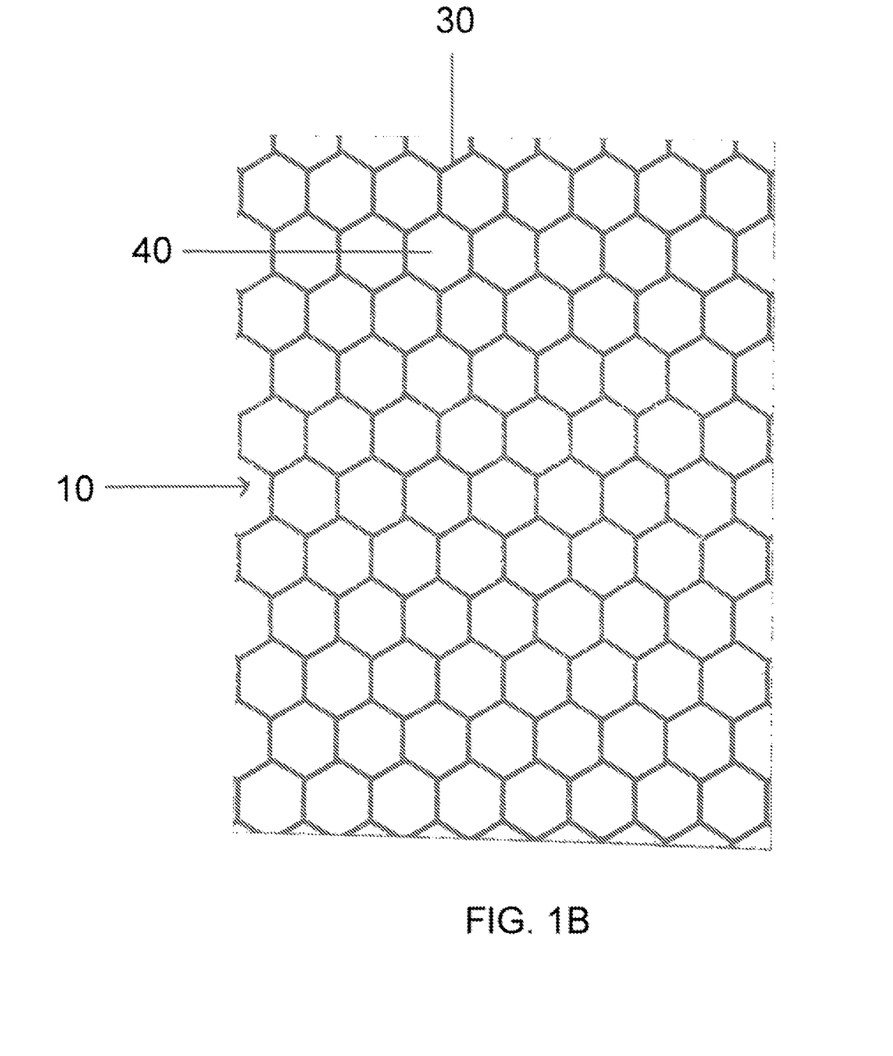
Figure 1C:
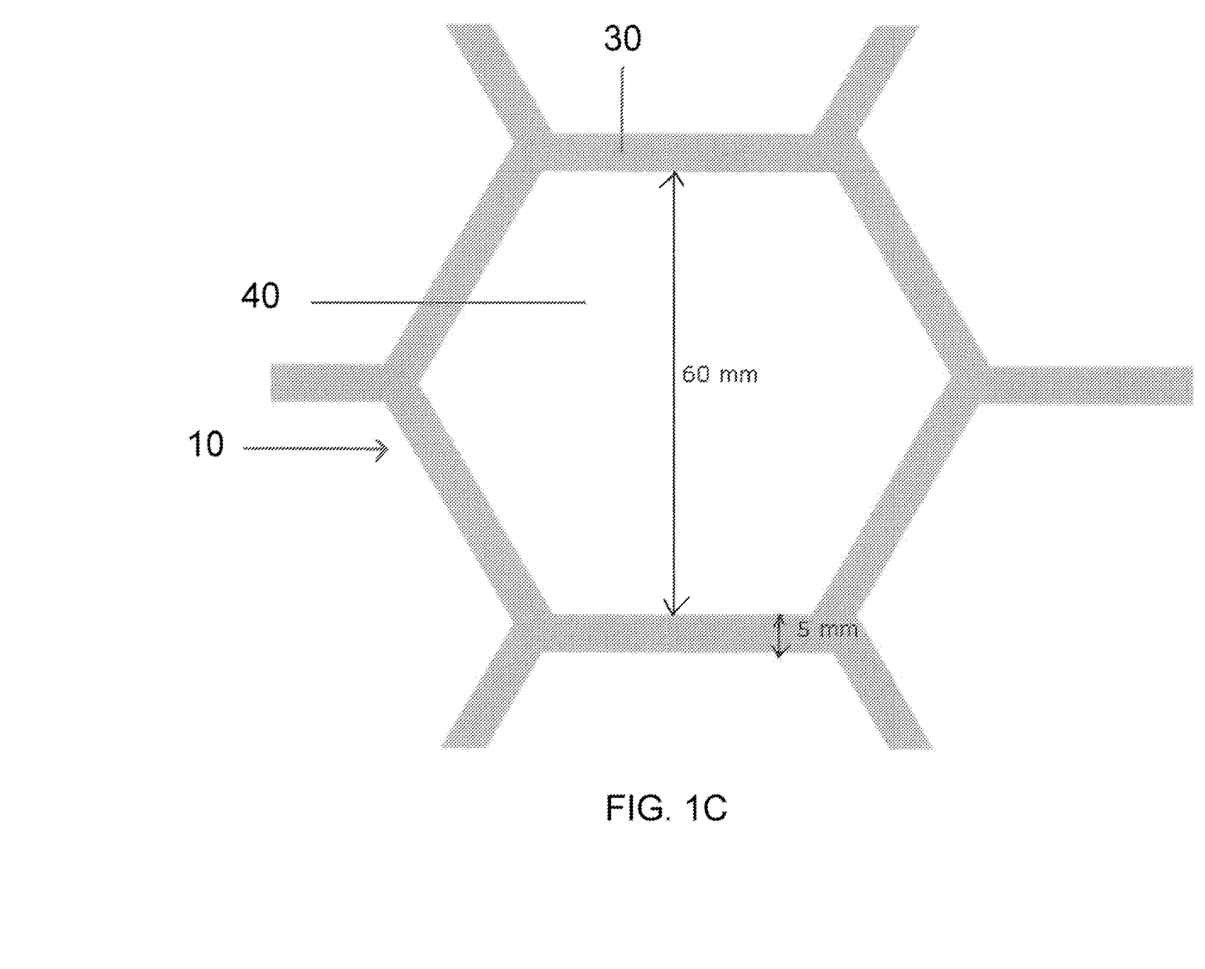
Figure 2:
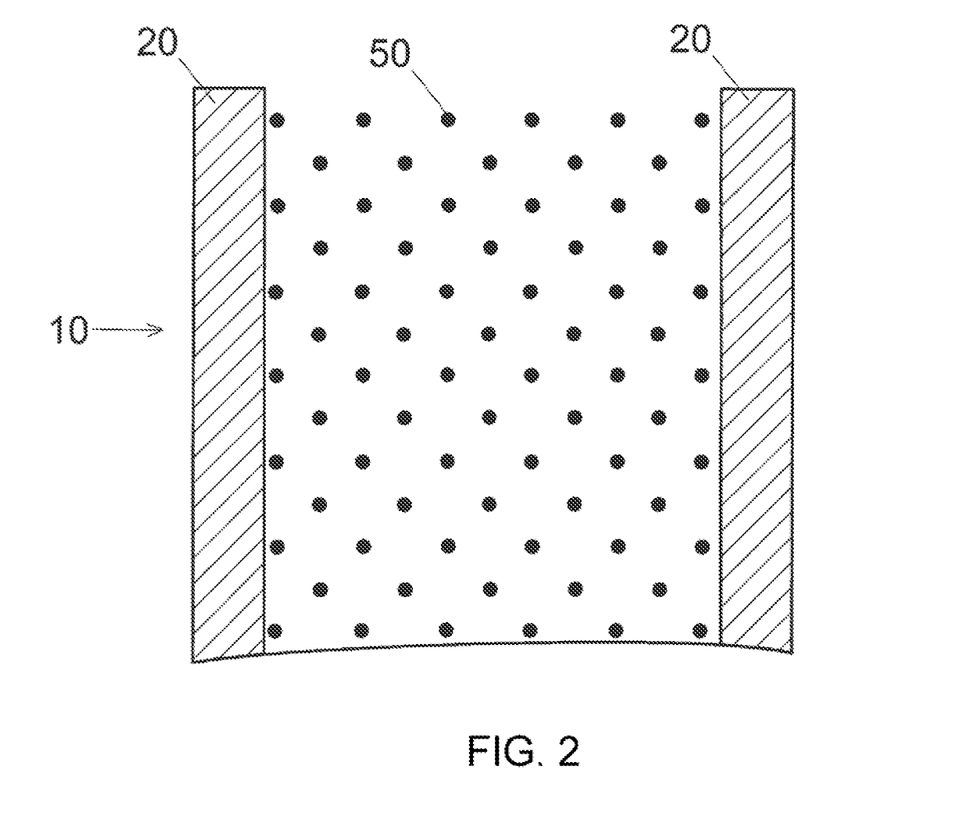
FIG. 2 is a top plan view of an alternative embodiment of the partially laminated film 10 showing the two strips of adhesive 20 adhering the edges of the top film 12 to the edges of the bottom film 14 and also showing the dot pattern of adhesive 50.
Figure 3:
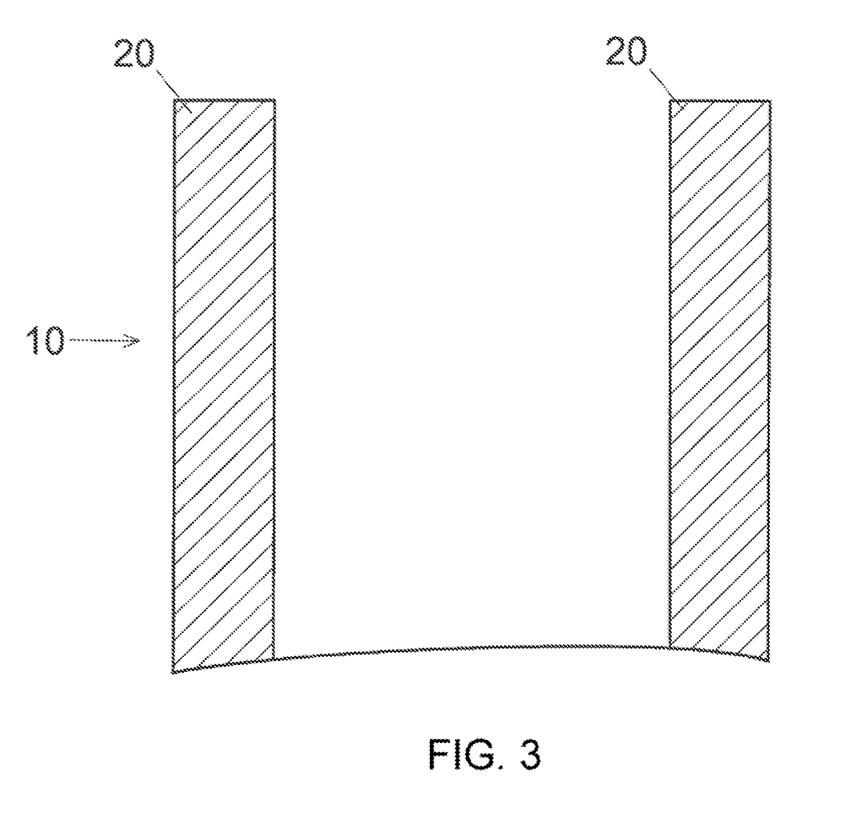
FIG. 3 is a top plan view of another alternative embodiment of the partially laminated film 10 showing the two strips of adhesive 20 adhering the edges of the top film 12 to the edges of the bottom film 14. In this embodiment the only adhesive connection between top film 12 and bottom film 14 are the edge strips 20.
Figure 4:
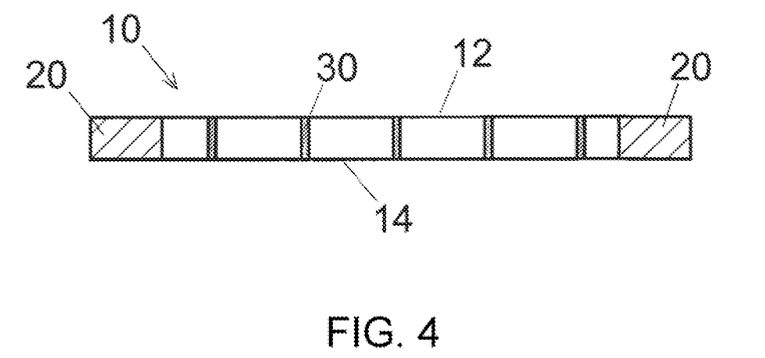
FIG. 4 is a cross section of the partially laminated film 10 along line 4-4 of FIG. 1. It shows the top film 12 joined to the bottom film 14 by the side strips of adhesive 20 and the honey comb pattern of adhesive 30.

The construction of suitable partially laminated double walled films is illustrated in FIGS. 1-4. In FIGS. 1A, 1B and 1C two thermoplastic component films have been laminated in a face to face configuration to yield the double wall partially laminated film 10. In FIG. 1A, the lamination is effected using two side strips of adhesive 20 and a honeycomb pattern of adhesive 30 between the centers of the two facing surfaces. This leaves circular voids 40 between the two facing surfaces. In FIGS. 1B and 1C, the lamination is achieved by applying an adhesive 30 in a honeycomb pattern which leaves hexagon voids 40 between the two facing surfaces. As illustrated in FIGS. 1B and 1C, hexagonal adhesive voids 40 are created by pattern applying adhesive 30 in a hexagonal shape having an application width of approximately 5 mm spaced apart by a distance of 60 mm. The resulting cross-section along line 4-4 in FIG. 1A is shown in FIG. 4. The component films 12 and 14 are adhered together by both the side strips of adhesive 20 but also the honeycomb pattern of adhesive 30. FIG. 2 illustrates an alternative approach in which the adhesive pattern between the facing surfaces of the component films is a pattern of circular dots of adhesive 50, along with the side strips of adhesive 20. FIG. 3 illustrates a third alternative in which the two component films are simply adhered together with the side strips of adhesive 20.

Figure 5:
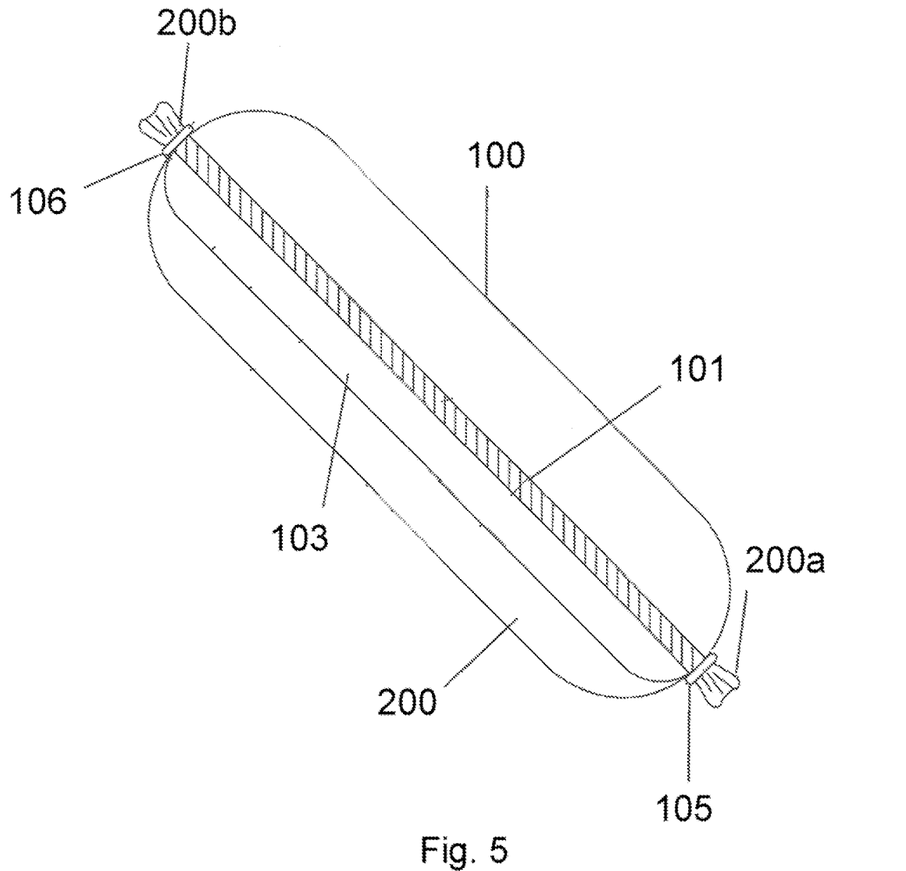
FIG. 5 illustrates a fragmentary cross-sectional view of a preferred embodiment of film 10 according to the present invention depicting a multilayer construction.

FIG. 5 illustrates one embodiment of a chub package 100 in accordance with the present invention formed from a double walled partially laminated web 10. Package 100 includes a longitudinal seam 101 provided by joining a first side edge to a second side edge of laminate 10 which defines a tubular member 200. Tubular member 200 includes a first end 200a, an opposing second end 200b. Tubular member 200 is depicted in the closed state having a first top seal 105 formed by crimping first tubular end 200a and a bottom seal 106 formed by crimping first tubular end 200b. It will be understood that top seal 105 and bottom seal 106 may also be formed as heat seals across the width of non-cylindrical shaped packages of the present invention. FIG. 1 also illustrates heat sealed portion 102 in an overlapping seal condition where the inner surface of tubular member 200 is heat sealed to the outer surface of tubular member 200. It is also contemplated that in other embodiments of the invention, heat sealed portion 102 may be formed in a fin seal condition by heat sealing the inner surface of tubular member 200 to itself. Longitudinal seam 101 further includes a non-heat sealed portion 103 which is adjacent to and parallel with heat sealed portion 102. Non-heat sealed portion 103 provides the consumer a means to grasp the package to facilitate the opening of package 100. In this particular embodiment of the invention, non-heat sealed portion 103 has a length which extends the entire length of tubular member 200 and a width which is proportional to that of heat sealed portion 102. In other embodiments, non-heat sealed portion 103 may have a length less than the entire length of tubular member 200 and a width which is not proportional to that of heat sealed portion 102. It is also contemplated that package 100 may further include one or more tear notches (not shown) within non-heat sealed portion 103 which would provide a means for initiating the peeling of laminate 10 and tearing of heat sealed portion 102. Those skilled in the art would recognize that tear notches may include V-shaped notches, I-shaped notches, or any other flaw in tubular member 200 which would facilitate the opening of package 100.

WORKING EXAMPLES

Example 1

A chub packaging web was formed from a partially laminated film in accordance with the present invention. The partially laminated film was about 2.2 mils thick and was the result of partially adhesively laminating two identical 1.1 mil thick 7 layer blown component films together. The partially laminated film was made by using a honeycomb pattern of a two component polyurethane adhesive in which the circular adhesive free voids were 60 mm in diameter and were spaced 5 mm apart giving an adhesive surface area of approximately 21.5% of the total surface area. The 1.1 mil 7 layer film had a general composition and weight percentage of each layer relative to the total weight of the film being as follows: 23.1% sealant layer of a mixture of very low density polyethylene (VLDPE) and ethylene vinyl acetate copolymer (EVA) (59.00 wt % of VLDPE, 35.00% wt % EVA and the balance additives/8% of tie layer for nylon adhesion (90 wt % VLDPE and 10 wt % anhydride modified linear low density polyethylene (LLDPE))/20% nylon (Nylon 6)/9.7% ethylene vinyl alcohol (EVOH)/20 wt % nylon (Nylon 6)/8% of tie layer for nylon adhesion (90 wt % VLDPE and 10 wt % anhydride modified LLDPE)/11.2% of a mixture of VLDPE and LLDPE (60.00 wt % VLDPE, 32.00 wt % VLDPE and the balance additives. Before laminating the two component films together, each film was moisturized by passing the film between two nip rollers with one roller carrying a curtain of water similar to a rotogravure process. The film was moisturized in this manner to an extent that it gained approximately 3% water when compared to its original weight prior to moisturization. The moisturized film was then allowed to equilibrate for seven days. The sealant layer of each film was then corona treated to a surface energy between 44 and 50 dynes/cm$^2$ and subsequently adhesively laminated together using the honeycomb pattern with a two part polyurethane. The adhesive was applied to give 1.3 parts by weight of adhesive solids per 200 parts by weight of partially laminated web.

Comparative Example 1

A first comparative web was formed having a thickness of 2.2 mils and double wall partially laminated construction identical to the web described above in Example 1, except that the two component films were not moisturized prior to lamination.

Comparative Example 2

A second comparative web having a thickness of 2.2 mils thick unitary construction, i.e., no double walls, 13 layers and a central core layer of EVA was formed by collapsing 7 layer blown film having a general composition and weight percentage of each layer relative to the total weight of the film being as follows: 23% sealant layer of a mixture of very low density polyethylene (VLDPE) and ethylene vinyl acetate copolymer (EVA) (59.00 wt % of VLDPE, 35.00% wt % EVA and the balance additives/7.4% of tie layer for nylon adhesion (100 wt % anhydride modified linear low density polyethylene (LLDPE))/15.1 wt % nylon (Nylon 6)/9.7% ethylene vinyl alcohol (EVOH)/15.1% nylon (Nylon 6)/18.3% of tie layer for nylon adhesion (90 wt % LLDPE and 10 wt % anhydride modified LLOPE)/11.2% of central core layer of EVA.

Comparative Example 3

A third comparative web having a thickness of 2.2 mils thick unitary construction, i.e., no double walls, 13 layers and a central core layer of EVA was formed from an identical film structure as that described in Comparative Example 2, except that each nylon layer was 20% and not, 15.1% relative to the total weight of the film.

Roll stock of each of Example 1 and Comparative Examples 1-3 webs as described above were evaluated for puncture resistance as measured by the total energy absorption during a Dart Drop Impact Test at −20° C. using a 0.25 inch radius test probe with a weight of 35 pounds and a falling distance of 22 inch. The total energy absorption measures the kinetic energy lost by a free-falling dart that passes through each film specimen. The loss of kinetic energy caused by the penetration of the film specimen represents the impact toughness of the specimen. The total energy impact absorption may be measured in accordance with ASTM D-7192 test method. The energy absorption of webs for Example 1 and Comparative Examples 1-3 were as follows:

TABLE 1

Puncture Resistance At −20° C.

| SPECIMEN | Energy Absorption (ft-lbs) |
| --- | --- |
| EXAMPLE 1 | 1.13 |
| COMPARATIVE EXAMPLE 1 | 0.09 |
| COMPARATIVE EXAMPLE 2 | 0.44 |
| COMPARATIVE EXAMPLE 3 | 0.59 |

A person having ordinary skill in the art would recognize that the puncture resistance is a measure of a film's toughness and puncture resistance. A packaging web with a high total energy absorption value, relative to an incumbent film, is tougher and more puncture resistant and thus, would be desirable to the packaging industry.

The above disclosure is for the purpose of illustrating the present invention and should not be interpreted as limiting the present invention to the particular embodiments described but rather the scope of the present invention should only be limited by the claims which follow and should include those modifications of what is described which would be readily apparent to one skilled in the art.

What is claimed is:

1. A packaging web formed from a double wall partially laminated web, the partially laminated web comprising first and second independently manufactured thermoplastic films, the films being juxtaposed with a first surface of the first film facing a first surface of the second film, a portion of the first surface of the first film being laminated to the first surface of the second film comprising:
   a. a substantial portion of the first surface of the first film being un-laminated to the first surface of the second film, the first film having a second surface opposite the first surface of the first film, the second film having a second surface opposite the first surface of the second film;
   b. the second surface of one of the first and second independently manufactured films is heat sealable;
   c. each of the first and second independently manufactured films comprises at least one layer of nylon; and
   d. each of the first and second independently manufactured films comprises at least four layers, each of the layers comprising ultra-low density polyethylene.

2. The web of claim 1 wherein less than 50% of the surfaces of the first and second independently manufactured films are laminated to each other.

3. The web of claim 1 wherein each of the first and second independently manufactured films has a moisture content between 1% and 3% by weight.

4. The web of claim 1 wherein the double wall partially laminated web has a total energy impact absorption value of about 1.0 foot-pound at −20° C. as measured in accordance with ASTM D-7192 test method.

5. The web of claim 1 wherein the structures of the first and second independently manufactured films are identical.

6. The web of claim 1 wherein the surface of each of the first and second independently manufactured films that face each other are heat sealable.

7. The web of claim 1 wherein the ultra-low density polyethylene has a density of 0.907 grams/cm$^3$ and a melt index of 0.80 grams/10 min (190° C./2.16 kg).

8. The web of claim 1 wherein each of the first and second independently manufactured films comprises one layer of ethylene vinyl alcohol copolymer.

9. The web of claim 1 wherein each of the first and second independently manufactured films comprises at least two tie layers each comprising ultra-low density polyethylene.

10. The web of claim 1 wherein the web Is formed into a cylindrically shaped chub package comprising a comminuted product.

11. The web of claim 1 wherein the first and second independently manufactured films are adhesively laminated with a two part polyurethane adhesive having a solids content greater than 30 wt %.

12. The web of claim 1 wherein the first and second independently manufactured films are adhesively laminated.

13. The web of claim 12 wherein the adhesive is present in a repeating pattern.

14. The web of claim 13 wherein said pattern is a honeycomb, spaced apart hexagon, circles or spaced apart strips.

15. The web of claim 1 wherein each of the first and second independently manufactured films comprises at least two layers of nylon and has a moisture content greater than 0.5% by weight.

16. The web of claim 15 wherein each of the first and second independently manufactured films has a moisture content between 0.5% and 0.75% by weight.

17. The web of claim 1 wherein each of the first and second independently manufactured films is between about 0.5 mil and 2 mil thick.

18. The web of claim 17 wherein each of the first and second independently manufactured films is between 0.5 mil and 1.0 mil thick.

19. A chub packaging web formed from a double wall partially laminated web with enhanced puncture resistance comprising two independently manufactured thermoplastic films being partially laminated to each other such that:
   a. a substantial portion of the surfaces of the two independently manufactured films facing each other are un-laminated;
   b. the unlaminated surface of one of the two independently manufactured films is heat sealable;
   c. each of the two independently manufactured films comprises at least one layer of nylon;
   d. the double wall partially laminated web has a moisture content of greater than 1% by weight;
   e. each of the two independently manufactured films comprises at least four layers comprising ultra-low density polyethylene; and
   f. wherein the double wall partially laminated web has a total energy impact absorption value of greater than 0.59 foot-pound at −20° C. as measured in accordance with ASTM D-7192 test method.

20. A chub packaging web formed from a double wall partially laminated web with enhanced Puncture resistance comprising two independently manufactured thermoplastic films being partially laminated to each other such that:
   a. a substantial portion of the surfaces of the two independently manufactured films facing each other are un-laminated;
   b. the unlaminated surface of one of the two independently manufactured films is heat sealable;
   c. each of the two independently manufactured films comprises at least one layer of nylon;
   d. the double wall partially laminated web has a moisture content of greater than 1% by weight;
   e. each of the two independently manufactured films comprises four layers having at least 25% by weight ultra-low density polyethylene; and
   f. wherein the double wall partially laminated web has a total energy impact absorption value of greater than 0.59 foot-pound at −20° C. as measured in accordance with ASTM D-7192 test method.

\* \* \* \* \*

UNITED STATES PATENT AND TRADEMARK OFFICE
CERTIFICATE OF CORRECTION

PATENT NO. : 9,827,738 B2
APPLICATION NO. : 15/029108
DATED : November 28, 2017
INVENTOR(S) : Otacilio T. Berbert Page 1 of 1

It is certified that error appears in the above-identified patent and that said Letters Patent is hereby corrected as shown below:

On the Title Page

In Column 2, item (57), Line 3, under Abstract, delete "waii" and insert -- wall --.

In Column 2, item (57), Line 11, under Abstract, after "greater" insert -- than --.

In the Specification

In Column 3, Lines 45-47, delete "FIG. 5 illustrates a fragmentary cross-sectional view of a preferred embodiment of film 10 according to the present invention depicting a multilayer construction.".

In Column 3, Line 48, delete "FIG. 6" and insert -- FIG. 5 --.

In Column 4, Line 62, delete "ATTANE™4203" and insert -- ATTANE™ 4203 --.

In Column 6, Line 54, after "60.00 wt %", delete "VLDPE." and insert -- VLDPE, --.

In Column 7, Line 28, delete "LLOPE)" and insert -- LLDPE) --.

In the Claims

In Column 8, Line 57, Claim 10, delete "Is" and insert -- is --.

Signed and Sealed this
Twentieth Day of August, 2019

Andrei Iancu
*Director of the United States Patent and Trademark Office*